United States Patent
Nagai

[19]

[11] Patent Number: 6,108,501
[45] Date of Patent: Aug. 22, 2000

[54] COLOR IMAGE FORMING APPARATUS AND METHOD

[75] Inventor: Etsuo Nagai, Yokohama, Japan

[73] Assignee: Ricoh Company, Ltd., Tokyo, Japan

[21] Appl. No.: 09/031,544

[22] Filed: Feb. 27, 1998

[30] Foreign Application Priority Data

Feb. 28, 1997 [JP] Japan ................... 9-045915

[51] Int. Cl.[7] .................... B41J 2/385; G03G 15/01
[52] U.S. Cl. .................... 399/116; 347/233; 347/248; 347/262
[58] Field of Search .................... 347/115, 116, 347/233–235, 248–250, 262, 264

[56] References Cited

U.S. PATENT DOCUMENTS

| | | | |
|---|---|---|---|
| 5,006,705 | 4/1991 | Saito et al. | 250/235 |
| 5,471,236 | 11/1995 | Ito | 347/233 |
| 5,737,006 | 4/1998 | Wong | 347/235 |
| 5,774,169 | 6/1998 | Ikegawa et al. | 347/262 |
| 5,774,248 | 6/1998 | Komatsu | 347/233 X |
| 5,821,978 | 10/1998 | Yamamoto et al. | 347/235 |

*Primary Examiner*—Matthew S. Smith
*Attorney, Agent, or Firm*—Oblon, Spivak, McClelland, Maier & Neustadt, P.C.

[57] ABSTRACT

A color image forming apparatus and method avoid a problem of color image shifting due to respective line start times that are largely shifted in a sub-scanning direction. The method and apparatus include compensation mechanisms configured to adjust the start position of writing images of respective color components in the sub-scanning direction and thereby compensating the color shift, by changing over the light beam by first writing the images of the respective colors on the photosensitive body among the plural light beams in accordance with a phase relationship between the phase of the intermediate transfer standard signal and that of the line synchronization signal.

43 Claims, 6 Drawing Sheets

COLOR IMAGE FORMING APPARATUS AND METHOD

BACKGROUND OF THE INVENTION

1. Field of the Invention

The present invention relates to a color image forming apparatus and method usable with a color copying machine, color printer, color facsimile device, etc., having a light beam emitting mechanism for emitting plural light beams and an intermediate transfer body.

2. Description of the Related Art

Conventionally, color image forming apparatuses and methods formed a color image by using a single laser light source. In these cases, a photosensitive body moves in a subscanning direction by way of a rotational drive force created by the rotational driving section and the same body is uniformly charged by a charging mechanism. One line of laser beam emitted from the single laser light source is scanned, or moved in a predetermined direction, by a scanning mechanism, such as a rotating polygon mirror, etc., and radiated to the charged surface of the photosensitive body. Using the beam, plural color images are sequentially written on the charged surface of the photosensitive body an electrostatic latent images.

The electrostatic latent images of the plural colors thus formed are developed by plural developing media and thereby converted to respective visible toner images of plural colors. The toner images of plural colors formed on the photosensitive body are superposedly transferred respectively onto an intermediate transfer body by using a transfer mechanism. Thereby, a full-color image can be formed on the transfer mechanism.

The full-color image thus transferred onto the intermediate transfer body is further transferred onto a transfer material such as recording paper, OHP sheet, etc. and conveyed from a paper feeding apparatus by use of the (other) transfer body. The transfer material having the full-color image with the transferred image thereon is discharged from the color image forming apparatus.

Hereupon, the scanning mechanism is rotatively driven by a motor, etc. with a predetermined revolving velocity. A line synchronization signal generating mechanism detects a light beam (laser beam) from the scanning mechanism at a predetermined position and generates a line synchronization signal. The laser beam is modulated by the image signal in synchronism with the line synchronization signal, and thus the image writing operation is performed line by line.

An intermediate transfer standard signal generating mechanism detects a mark on the intermediate transfer body at a predetermined position and generates an intermediate transfer standard signal. The image forming operation of the respective colors for forming the toner images of the respective colors on the photosensitive body is performed in synchronism with the intermediate transfer standard signal.

In such an color image forming apparatus, when a high efficiency is required, it is necessary to raise the revolution rate of the scanning mechanism or the frequency of the image signal. However, the revolution rate of the scanning mechanism or the frequency of the image signal are limited and the color image forming operation could not always be preformed with the desired speed. In order to cope with such problems, there has been proposed a color image forming apparatus in the multiple-laser system having a plurality of laser light sources.

In such multiple-laser system color image forming apparatus, plural laser beams emitted from plural laser light rays are scanned by the scanning mechanism such as a polygon mirror, etc., and radiated to the charged surface of the photosensitive body. Thereby, the images are written at the same time on the photosensitive body.

The line synchronization signal generating mechanism detects the light beam from the scanning mechanism at the predetermined position and generates one line synchronization signal per light beam. The plural lines of laser beams are modulated by the image signal in synchronism with the line synchronization signal, and the writing operations of the image per plural lines are performed at the same time. Consequently, since the amount of the information to be written in on the photosensitive body is increased, the revolution rate of the scanning mechanism or the frequency of the image signal can be reduced, and thereby the stable image can be formed with high speed.

In such multiple-laser system color image forming apparatuses, since the intermediate transfer standard signal are not synchronized with the line synchronization signal, there is a probability that the higher the number of laser light sources become, an increase in phase difference between the intermediate transfer standard signal and the line synchronization signal is shifted. Thereby, the starting position of writing of the image in the sub-scanning direction shifts largely. Consequently, the color shifting (the position shifting of the toner image of the respective colors) occurs and thereby the quality of the color image deteriorates.

SUMMARY OF THE INVENTION

The present invention was made in consideration of the above-mentioned problems, and it is an object of the present invention to solve these problems.

It is another object of the present invention to compensate for color shifting by adjusting a start position for writing in a sub-scanning direction and thereby obtain the color image of high quality.

It is still another object of the present invention to minimize color shifting in order to obtain a high quality color image by adjusting the start position for writing in the image in the sub-scanning direction and compensating for the color shifting.

It is yet another object of the present invention to eliminate deteriorated image quality.

It is still another object of the present invention to provide a color image forming apparatus that compensates for color shifting by adjusting the start position for writing the image in the sub-scanning direction, and thereby obtain high quality color image.

It is still another object of the present invention to provide a color image forming apparatus capable of minimizing color shifting in order to obtain high quality color images by adjusting the start position for writing in the image in the sub-scanning direction and compensating for the color shifting.

A color image forming apparatus and method avoid a problem of color image shifting due to respective line start times that are largely shifted in the sub-scanning direction. The method and apparatus include compensation media capable of adjusting the start position of writing the images of the respective colors in the sub-scanning direction and thereby compensating the color shift, by changing over the light beam for firstly writing the images of the respective colors on the photosensitive body among the plural light beams in accordance with a phase relationship between the phase of the intermediate transfer standard signal and that of the line synchronization signal.

More particularly, in order to attain the above-mentioned objects, a first status of the present invention provides a color image forming apparatus having a light beam emitting mechanism for emitting plural light beams, a scanning mechanism for scanning the plural light beams emitted from the light beam emitting mechanism, a photosensitive body moving in the sub-scanning direction and scanned by the plural light beams emitted from the scanning mechanism on which electrostatic latent image composed of plural colors is formed in order by moving in the sub-scanning direction and scanning by plural light beams emitted from the scanning mechanism and thereby writing the image composed of plural colors in order. A line synchronization signal generating mechanism is included for generating a line synchronization signal by defecting the light beams, as is a plural developing mechanism for developing the electrostatic latent image of the plural colors formed on the photosensitive body and thereby obtaining tones image of plural colors. An intermediate transferring body is included so that the tones image of plural colors may be transferred thereon, on top of one another. An intermediate transfer standard signal generating mechanism is included for detecting a mark on the intermediate transferring body and thereby generating the intermediate transfer standard signal. The operation of forming the image of respective colors is performed in synchronism with the intermediate transfer standard signal generated by the intermediate transfer standard signal generating mechanism, wherein the light beam is modulated with the image signal in synchronism with the line synchronization signal, and thereby the image is written line by line.

The color image forming apparatus also includes a compensation mechanism for adjusting the starting position of writing the image in the sub-scanning direction per each of the respective colors and thereby compensating the color shift, by changing the light beam from among the plural light beams for firstly writing in the image onto the photosensitive body in accordance with the phase relationship between the intermediate transfer signal and the line synchronization signal.

In such structure as mentioned above, the starting position for writing the image is adjusted in the sub-scanning direction and thereby the color shifting can be compensated. Consequently, the color image of higher image quality can be formed.

The second status of the present invention in relation to the first status provides the color-image forming apparatus in which a starting position for writing the image of the first color among the plural colors is standardized and other starting positions for writing in the images of the second and subsequent colors are adjusted on the basis of the standardized starting position and thereby the respective color shifts are compensated for each other. Accordingly, in such a structure as mentioned above, the color shifting can be minimized.

The third status of the present invention in relation to the first status provides the color image forming apparatus in which an effective image area in the sub-scanning direction is changed over per each of the respective light beams and thereby unnecessary data are deleted. In such structure as mentioned above, the condition of deteriorating the image quality can be eliminated and thereby the image quality can be improved.

The present invention is concerned with the above-mentioned first through third statuses of the invention. The embodiment relates to the digital color image forming method and apparatus of the electrophotographic system composed of a digital color copying machine of the electrophotographic system. The above-mentioned color copying machine includes a color printer functioning as an image forming section of the electrophotographic system which performs the image forming operation on transfer paper employed as the transfer material utilizing the electrophotographic process. A scanner is employed as a manuscript (original) document reading mechanism for scanning the manuscript document and reading the image therefrom and thereby obtaining the image signals of plural colors; for instance, red, blue and green and converting the obtained image signal to a digital image signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 4:
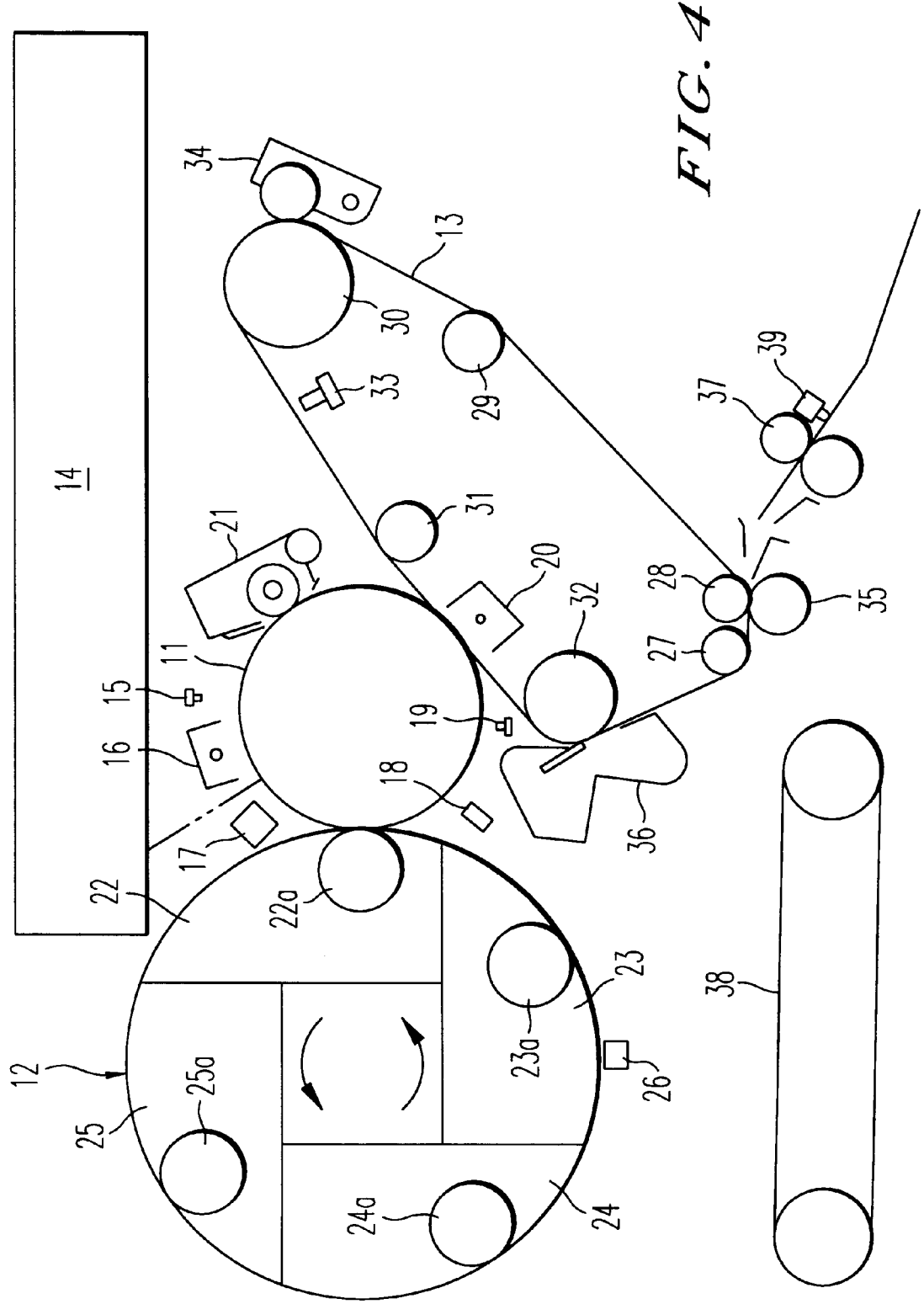
FIG. 4 is a cross-sectional view showing an outline of a color printer in the above-mentioned embodiment.

Referring now to the drawings, wherein like reference numerals designate identical or corresponding parts throughout the several views, and more particularly to FIG. 4 thereof, there is illustrated a main structure of the above-mentioned color printer. The color printer includes a photosensitive body 11, a rotating apparatus 12, an intermediate transfer belt 13 employed as the intermediate transfer body, and a writing apparatus 14 functioning as the light-exposing mechanism. Although a photosensitive drum is used as the photosensitive body 11, a photosensitive belt can be also used instead of the photosensitive drum. Furthermore, instead of the intermediate transfer belt 13, another intermediate transfer body such as an intermediate transfer drum, an intermediate transfer roller, and so on can be also used.

As shown in FIG. 4, around the photosensitive body 11, there are arranged a charge removing lamp 15 (hereinafter, called "QL") employed as a charge removing mechanism for removing the charge on the photosensitive body 11, a scorotron charger, that is, a corona charger having a screen electrode 16 (hereinafter, called "charging charger") employed as a charging mechanism for uniformly charging the photosensitive body 11, an electric potential meter 17, a photo-sensor 18 (hereinafter, called "P-sensor") employed as a density detecting mechanism for optically detecting the amount of attached toner (toner density) on the photosensitive body 11, a pre-transfer charge removing lamp 19

(hereinafter, called "PTL") for removing the charge on the photosensitive body 11 before transferring the toner image, a belt-state transfer charger 20 employed as a transfer mechanism for transferring the toner image formed on the photosensitive body 11 onto the intermediate transfer belt 13, and a cleaning apparatus 21 for cleaning the photosensitive body.

The rotating apparatus 12 holds a plurality of developing apparatuses for developing the electrostatic latent images of the respective colors formed on the photosensitive body 11 and converts the latent images to the toner images of the respective colors. For instance, the rotating apparatus 12 holds a developing apparatus 22 for developing the electrostatic latent image on the photosensitive body 11, so as to obtain black toner image, a developing apparatus 23 for developing the electrostatic latent image on the photosensitive body 11, so as to obtain cyan toner image, a developing apparatus 24 for developing the electrostatic latent image on the photosensitive body 11 so as to obtain magenta toner image, and a developing apparatus 25 for developing the electrostatic body 11 so as to obtain yellow toner image. The rotating apparatus 12 is rotatively driven by a revolver motor employed as the driving mechanism and selectively moves the plural developing apparatuses 22 through 25 to the developing position.

In the plural developing apparatuses 22 through 25, developing sleeves 22a through 25a are opposed to the photosensitive body 11 on the developing position at the time of respectively performing the developing operation. The developing sleeves 22a through 25a are rotatively driven by the developing roller end transport the developer (developing agent) stored in the developing apparatuses 22 through 25 into the developing areas between the photosensitive body 11 and the developing sleeves 22a through 25a, in such a way that the electrostatic latent image formed on the photosensitive body 11 is developed. A revolver home-position sensor 26 thereinafter, called "revolver HP sensor," detects the state in which the rotating apparatus 12 is located at the stopping standard position.

The intermediate transfer belt 13 is suspended on the plural rollers 27 through 32. A predetermined roller among those rollers 27 through 32 is rotatively driven by a drum motor and the intermediate transfer belt 13 also rotates. At the inside of the intermediate transfer belt 13, there is provided a standard mark employed as a standard reference point for positioning the toner images of the respective colors at the time of the image superposing when transferring the respective color toner images on the photosensitive body 11 onto the intermediate transfer belt 13 per each of the respective picture planes.

Near the intermediate transfer belt 13, there are arranged, along the belt 13 in the rotational direction thereof, a belt mark sensor 33 (hereinafter, called "mark sensor") employed as a mark detecting mechanism for detecting the standard mark on the intermediate transfer belt 13, a lubricant applying apparatus 34 for applying the lubricant onto the intermediate transfer belt 13 and is brought into direct contact therewith when the lubricant applying solenoid is turned on, a paper transfer apparatus 35 employed as a transfer mechanism for transferring the color image on the intermediate transfer belt 13 onto the transfer paper, and a belt cleaning apparatus 36 employed as a cleaning mechanism for cleaning the intermediate transfer belt 13 and thereby removing the toner on the belt 13.

The belt cleaning apparatus 36 is constructed with, for instance, a cleaning member composed of a cleaning blade. The apparatus 36 is attached to or detached from the intermediate belt 13 in accordance with the ON/OFF operation of a solenoid for attaching/detaching the belt cleaning apparatus 36. When the belt cleaning apparatus 36 is brought into direct contact with the intermediate transfer belt 13, the toner on the intermediate belt 13 is removed therefrom.

The paper transfer apparatus 35 is disposed so as to oppose to the lowermost portion of the intermediate transfer belt 13, and the belt cleaning apparatus 36 is disposed between the paper transfer apparatus 35 and the belt transfer charger 20. The belt cleaning apparatus 36 can be attached to and detached from the intermediate transfer belt 13 in accordance with the ON-OFF operation of the intermediate transfer belt cleaning solenoid. The lubricant applying apparatus 34 can be enabled or not enabled to apply the lubricant to the intermediate transfer belt 13 in accordance with the ON-OFF operation of the lubricant applying solenoid.

The circumferential length of the intermediate transfer belt 13 is the additional length obtained by adding two times an A4 lateral size to the interval between the respective transfer materials (conveying interval between the respective transfer material), and the same is equal to the two times the circumferential length of the photosensitive body 11. A color image per one sheet of A4 in its lateral direction is formed per one revolution of the photosensitive body 11. When the photosensitive body 11 rotates twice, the image per two picture planes with the same color is transferred onto the intermediate transfer belt 13.

In the conveying path for conveying the transfer sheet, a registration roller 37 is disposed at the upstream side of the paper transfer apparatus 35, while a conveying belt 38 is disposed at the downstream side of the paper transfer apparatus 35. A fixing apparatus having a fixing roller and a pressurizing roller brought into pressed contact with the fixing roller is disposed at the downstream side of the conveying belt 38.

The conveying belt 38 and the fixing roller in the fixing apparatus are rotatively driven by a main motor. A registration roller 37 is also rotatively driven by the main motor through a registration clutch. The registration clutch is the one for turning on and off the main motor for rotatively driving the registration roller, etc. A registration sensor 39 is located immediately before the registration roller 37 and detects the transfer paper. The transfer paper is fed to the registration roller 37 by a paper feeding apparatus selected from the plural paper feeding apparatuses.

Figure 5:
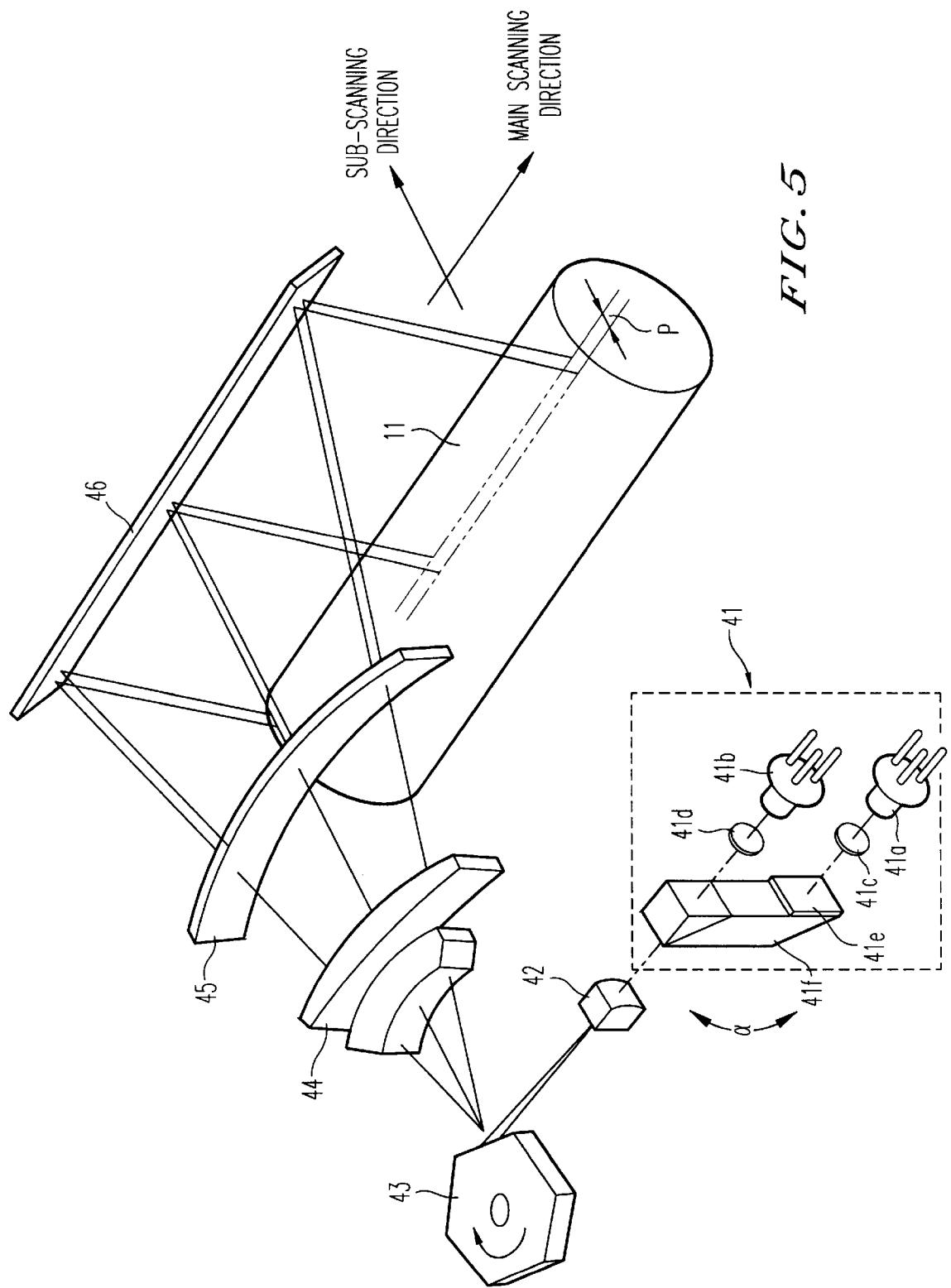
FIG. 5 is a perspective view of an optical scanning system of a writing apparatus in the above-mentioned embodiment.

FIG. 5 shows an optical scanning system of the aforementioned writing apparatus 14. In the writing apparatus 14, a plurality of light beams are emitted from a light source section 41 for emitting the light beam, composed of the plural laser beams (hereinafter, simply called "beam") are directed as incident light rays onto a rotatable multiple-surface mirror (polygon mirror) 43 through a cylinder lens 42. The respective beams directed as incident light rays onto the rotatable multiple-surface mirror 43 are scanned as a result of a rotational action of the rotatable multiple-surface mirror 43. The surface of the photosensitive body 11 is also scanned by being exposed with the light rays at the same time in the main scanning direction with the beam pitch P of the sub-scanning direction by use of an optical scanning system composed of an f-θ lens 44, a troidal lens 45, etc. and a folding-back (tuning-up) mirror 46 for folding back the light.

The rotatable multiple-surface mirror 43 is relatively driven by the polygon motor not shown. A synchronization detecting mechanism functioning as a line synchronization signal generating mechanism not shown in FIG. 5 detects the beam from the troidal lens 45 at a predetermined position excluding the writing area on the photosensitive body 11. The synchronization detecting mechanism detects the plural light beams directed as the incident light rays from the light source section 41 through the cylinder lens 42, the rotatable multiple-surfaces mirror 43, the fθ lens 44, and the troidal lens 45, and the same outputs one output signal for the plural light beams as the line synchronization signal.

In such a structure, the light source section 41, usually emits plural light beams modulated in accordance with the image signal by driving with the image signal the light sources 41a and 41b, for instance, composed of two semiconductor pieces. Furthermore, a pitch adjustment mechanism is provided in the light source section for adjusting the beam pitch in the sub-scanning direction. The light source section 41 is rotated by the pitch adjustment mechanism and thereby the beam pitch is adjusted in the sub-scanning direction. In the light source section 41, the light beams emitted from the light sources 41a and 41b composed of two semiconductor laser are respectively converted to the parallel light rays by use of the collimate lenses 41c and 41d. The parallel light rays thus converted pass through the slit of the aperture member (not shown in FIG. 5) and thereby the light rays are shape-controlled (namely, the cross-section of the light flux is controlled) so as to make equal to a predetermined light flux diameter.

The polarizing direction of the light beam emitted from one side of the aperture member is rotated just by 90° by use of the ½ γ plate 41e. The rotated light beam is directed as the incident light onto the beam composing prism 41f employed as the beam composing mechanism and reflected on the inner surface at the slanted surface of the beam composing prism 41f. The composed light beam is further composed in the neighborhood of the optical axis with the light beam from the other aperture member reflected at the polarizing light beam splitter surface of the beam composing prism 41f and becoming a standardized beam.

Two lines of light beam from the beam composing prism 41f are emitted in the main scanning direction with a predetermined angle difference θ m between each other. At the semiconductor laser 41a, the optical axis of the light beam is slightly more eccentric in the main scanning direction in relation to the collimate lens 41c, and the light source section 41 is rotated around the optical axis. Thereby, the sub-scanning angle component of the emission angle between the two-lines beams is obtained, and the adjustment of the beam pitch P is performed in the sub-scanning direction. Assuming that the rotational angle of the light source is α, the relationship between Δθs and θm is as follows:

$$\Delta\theta s = \theta m \cdot \sin \alpha$$

wherein, θm is a predetermined angle difference between the two lines of the light beam emitted from the light source, and Δθs is a value of θm multiplied by sin α. In the embodiment, two light sources 41a and 41b are employed. However, it is possible to employ three or more light sources.

Figure 6:
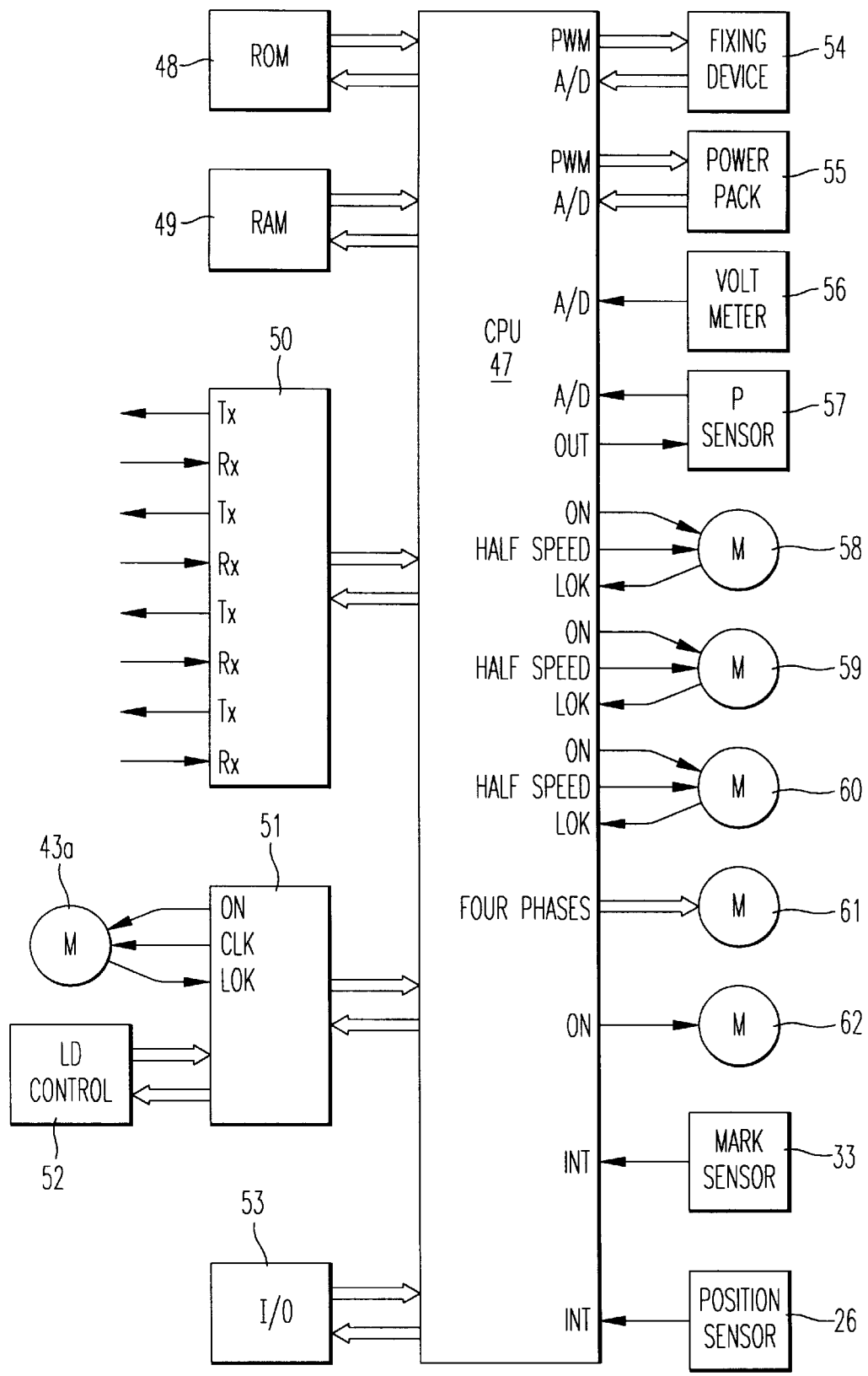
FIG. 6 is a block diagram of a control section of the above-mentioned color printer according to the present invention.

FIG. 6 shows the control section of the above-mentioned color printer. A CPU 47 executes the processing of the operational calculation, etc., in accordance with the contents of the control program. A ROM 48 includes a control program therein. A RAM 49 is employed for storing the data therein and evacuating the data therefrom. The CPU 47, the ROM 48 and the RAM 49 are connected with each other by use of the data bus or the address bus. A serial communication controller 50 performs the operations of transmitting/receiving of the command signal to be exchanged between the control section of the above-mentioned scanner and the CPU 47. The serial communication controller 50 is connected to the CPU 47 by use of the data bus and the address bus.

A writing controller IC 51 employed as the writing control section for performing the light exposure control for the photosensitive body 11 is connected to the CPU 47 by use of the data bus and the address bus, and further connected to a light-exposing LD control unit 52 and the above-mentioned polygon motor 43a and controls the light exposing LD control unit 52 and the polygon motor 43a. The light-exposing LD control unit 52 performs the operation of turning-on control for LD 41a and LD 41b in the writing apparatus 14 in accordance with the input signal from the writing control IC 51. An I/O controller 53 performs the input/output control for the CPU 47. The control section of the color printer is constructed with the CPU 47, the ROM 48, the RAM 49, the serial communication controller 50, the writing control IC 51, the light-exposing LD control unit 52, and the I/O controller 53.

A fixing apparatus 54 comprises a fixing thermistor for detecting the surface temperature of the above-mentioned fixing roller. The CPU 47 performs the A/D conversion of the temperature detection signal of the fixing thermistor and outputs the pulse width modulation (PWM) pulse signal on the basis of the value of the A/D conversion. In such structure, the ON/OFF control is performed for a fixing heater and thereby the surface of the fixing roller is controlled so as to keep that constant.

The CPU 47 performs the A/D conversion of the output voltage fed back from the power pack unit 55, and outputs the PWM signal to the power pack unit 55 on the basis of the value of the A/D conversion and controls the output voltage of the power pack unit 55. The power pack unit 55 applies a high voltage to the charging charger 16 (for charging the photosensitive body), the belt transfer charger 20 and the paper transfer apparatus 35, applies the grid voltage to the charging charger 16, and further respectively applies the developing bias voltage(s) to the developing sleeves 22a through 25a of the developing apparatuses 22 through 25.

An electric potential meter circuit 56 including an electric potential meter 17 detects the surface potential of the photosensitive body I 1. The output signal of the electric potential is inputted to the A/D input terminal of the CPU 97. The P sensor circuit 57 including the P sensor 18 composed of the light emission diode end the phototransistor optically detects the amount of attached toner (density) on the photosensitive body. The photo-transistor output signal of the P sensor 18 is inputted to the A/D input terminal. The CPU 47 outputs the PWM pulse to the light emission diode driving circuit in the P sensor 18.

The above-mentioned main motor 58 rotatively drives the transfer material conveying system for conveying the transfer material. The above-mentioned drum motor 59 rotatively drives the photosensitive body 11 and the intermediate transfer belt 13. The developing motors 60 are the motors for respectively driving rotatively the developing sleeves 22a through 25a in the developing apparatuses 22 through 25. The ON signal, the half speed signal for reducing the speed to half (½), and the lock signal for judging the matter on whether the speed reaches the aimed speed are respectively inputted from the CPU 47 to those motors.

A revolver motor 61 causes the rotating apparatus 12 equipped with the developing apparatuses 22 through 25 to rotate by the four-phases output signal inputted from CPU 47, and the developing apparatus for performing the development of the designated color which is selected among the developing apparatuses 22 through 25 is stopped on the developing position.

A toner replenishing motor 62 respectively replenishes the respective color toners of black, cyan, magenta end yellow into the developing apparatuses 22 through 25 from the respective toner cartridges. The CPU 47 controls the turning-on time of the toner replenishing motor in accordance with the amount of the attached toners of the respective colors; black, cyan, magenta and yellow on the basis of the input signal from the P sensor 18.

The output signal of the mark sensor 33 as the intermediate transfer standard signal employed as the standard for positioning the respective toner images at the time of superposing the image is inputted to the thrusting terminal of the CPU 47 because of the required severe timing accuracy.

The output signal of the revolver HP sensor employed as the standard of the stop position of the rotating apparatus 12 is inputted to the thrusting terminal of the CPU 47, because the strict timing accuracy is required for changing the output pulse (four-phases output signal) from the CPU 47 to the revolver motor 61 during the time period of rotating the rotating apparatus 12.

Next, the fundamental sequence in this embodiment is explained hereinafter, using as an example the full-color image of A4 lateral-direction size (A4 size in the direction of shortening the transfer material conveying direction) being successively formed for four picture plane. In the color printer, it is assumed that, in the stopping state, the rotating apparatus 12 is stopped in the state that the developing apparatus 22 of the black developing color is situated at the developing position.

The control section of the color primer (hereinafter, called "printer control section") turns on the QL15 and the drum motor 59 when the command of starting the color image formation (print start). For this reason, the drum motor 59 rotates and rotatively drives the photosensitive body 11 and the intermediate transfer belt 13. Thereby, the charge of the photosensitive body 11 is removed by the QL15.

The printer control section turns on the charging charger 16 when the starting position of the charge removing performed by the QL 15 on the photosensitive body 11 arrives at the position of performing the charging by use of the charging charger 16. Next, the primer control section turns on the developing bias applied to the power pack unit 55 and causes the developing motor 60 to rotate at the same time, when the position of starting the charging operation performed by the charging charger 16 on the photosensitive body 11 arrives at the developing position.

Furthermore, the printer control section turns on the belt transfer charger 20 when the position opposing the developing position at the time of turning on the developing bias on the photosensitive body 11 arrives at the transfer position (the position where the toner image on the photosensitive body 11 is transferred to the intermediate transfer belt 13). The operation lasts from the rotation start of the photosensitive body 11 until this point in time coincides with a pre-rotation of the photosensitive body 11.

At the same time, when the mark sensor 33 detects the standard mark on the intermediate transfer belt 13 by the rotation of the intermediate transfer belt 13, the mark detecting signal generated by the mark sensor 33 is inputted to the thrusting terminal of the CPU 47 as the intermediate transfer standard signal, and the printer control section performs the thrusting process on the program thereof. The printer control section transmits the scan starting command of the first picture plane—first color (black) in the thrusting process to the aforementioned scanner control section.

The scanner control section, when it receives the scan starting command of the first picture plane—first color from the printer control section, causes the scanner to read the manuscript document in order to obtain the image signal for the first picture plane—first color. The image signals of the plural colors (for instance; red, blue or green) thus read are respectively converted to the image signals of the first picture plane—first color, and the converted signals are transferred to the printer control section.

The printer control section transfers the image signal transferred from the scanner control section to the writing control section IC 51. The writing control section IC 51 converts the image signal to the light exposing data of the first picture plane —first color (the data for performing the light exposure of the first color by driving the semiconductor laser with the writing apparatus 14). The data thus converted are outputted to the light exposing LD control unit 52.

The light exposing LD control unit 52 controls the lighting of the LDs 41a and 41b in the writing apparatus 14 in accordance with the light exposing data of the first picture plane first color transmitted from the writing control section IC 51. Thereby, the control unit 52 writes the first picture plane—first color on the photosensitive body 11. In such way, the first picture plane—first color electrostatic latent image is formed on the photosensitive body 11.

The printer control section causes the developing motor to start the rotation of the developing sleeve 22a in the developing apparatus 22 for performing the development of the first picture plane—first color, prior to starting the writing by use of the writing apparatus 14.

The developing apparatus 22, when the electrostatic latent image of the first picture plane—first color on the photosensitive body 11 arrives at the developing position, starts the development of the electrostatic latent image in order to obtain the toner image of the first picture plane—first color.

When the toner image of the first picture plane—first color on the photosensitive body 11 arrives at the first transfer position (belt transfer position), the toner image is transferred onto the intermediate transfer belt 13 by use of the belt transfer charger 20. When the reading of the manuscript document is finished, in order to obtain the image of the first picture plane—first color, the scanner returns to the home position with high speed and waits at the home position until the continue reading the manuscript document in order to obtain the image signal of the next second picture plane—first color (black).

Next, the primer control section transmits to the scanner control section an indication that the scanning of the second picture plane—first color has started. When the scanner control section receives the indication, the scanner control section causes the scanner to read the manuscript document in order to obtain the second picture plane—first color. The scanner control section then converts the read-out image signal of the plural colors (for instance; red, blue or green) to the image signal of the second picture plane—first color, and transfers the converted image signal to the printer control section.

The printer control section transfers the image signal transferred from the scanner control section to the writing control section IC 51. The writing control section IC 51 converts the transferred image signal to the light exposing data of the second picture plane—first color, and outputs the converted data to the light exposing LD control unit 52. The light exposing LD control unit 52 performs the control of lighting up the LDs 41*a* and 41*b* in the writing apparatus 14 in accordance with the light exposing data of the second picture plane—first color from the writing control IC 51. In such a structure, the image of the second picture plane—first color is written in into the photosensitive body 11, and thereby the electrostatic latent image of the second picture plane—first color can be formed thereon.

The developing sleeve 22*a* in the developing apparatus 22, which is for performing the development of the first color, continues to rotate without stopping, even after finishing the development of the electrostatic latent image of the first picture plane—first color. Namely, the developing sleeve 22*a* continues to rotate during the writing operation of the writing apparatus 14. When the electrostatic latent image of the second picture plane—first color on the photosensitive body 11 arrives at the developing position, the developing apparatus starts the development of the electrostatic latent image in order to obtain the toner image of the second picture plane—first color.

When the toner image of the second picture plane on the photosensitive body 11 arrives at the first transfer position (belt transfer position), the toner image is transferred onto the intermediate transfer belt 13 by activation of the belt transfer charger 20. When the operation of reading the manuscript document for obtaining the image signal of the second picture plane—first color is finished, the scanner returns to the home position with high speed and waits at the home position until next first picture plane—second color (cyan) reading operation is started.

When the development of the electrostatic latent image of the second picture plane first color is finished, the printer control section causes the revolver motor 61 to rotate the rotating apparatus 12 such that the developing apparatus 23 for performing the development of the second color (cyan) arrives at the developing position and (immediately) stops thereon.

The printer control section causes the belt cleaning apparatus attaching/detaching solenoid 66 to part the belt cleaning apparatus 36 from the intermediate transfer belt 13 and prevents the image on the intermediate transfer belt 13 from being erased. Thereafter, the printer control section performs the thrusting process when the mark sensor 33 detects the standard mark on the intermediate transfer belt 13, and the mark detecting signal from the mark sensor 33 is inputted to the thrusting terminal on the intermediate transfer belt 13 as the intermediate transfer standard signal, and then the printer control section transmits a scanning start command for the first picture plane—second color (cyan).

When the scanner control section receives the start command, the scanner control section causes the scanner to perform the reading operation in order to obtain the image signal of the first picture plane—second color. The image signal of the plural colors thus read is converted to the image signal of the first picture plane—second color and the converted image signal is transferred to the printer control section.

The printer control section transfers the image signal transferred from the scanner control section to the writing control section IC 51. The writing control section IC 51 converts the image signal to the light exposing data of the first picture plane—second color and outputs the converted data to the light exposing LD control unit 52. The light exposing LD control unit 52 performs the control of lighting up of the LDs 41*a* and 41*b* in the writing apparatus 14 in accordance with the exposing data of the first picture plane—second color from the writing control section IC 51, and the unit 52 causes the photosensitive body 11 by writing in the image of the first picture plane—second color.

The printer control section causes the developing motor 60 to start the rotation of the developing sleeve 23*a* in the developing apparatus 23 for performing the development of the second color, prior to the start of writing operation of the writing apparatus 14. When the electrostatic latent image of the first picture plane—second color on the photosensitive body 11 arrives at the developing position, the developing apparatus 23 starts the process of developing the electrostatic latent image and forming the toner image of the first picture plane —second color.

When the toner image of the first picture plane-second color on the photosensitive body 11 arrives at the first transfer position, the toner image of the second color is transferred onto the same position as that of the toner image of the first picture plane—first color on the intermediate transfer belt 13 so as to superpose the toner image of the first picture plane—first color, by use of the belt transfer charger 20. When the scanner finishes reading the manuscript document in order to obtain the image signal of the first picture plane—second color, the scanner returns to the home position and waits at the home position until starting the manuscript document reading operation for obtaining the image signal of the next picture plane—second color (cyan).

Next, the printer control section transmits to the scanner control section an indication that the scanning of the second picture plane—second color is starting. When the scanner control section receives the indication, the scanner control section causes the scanner to perform the reading of the manuscript document operation in order to obtain the image signal of the second picture plane—second color. The read image signal of the plural colors is converted to the image signal of the second picture plane—second color, and the converted image signal is transferred to the printer control section.

The printer control section transfers the image signal transferred from the scanner control section to the writing control section IC 51. The writing control section IC 51 converts the image signal to the exposure data of the second picture plane—second color, and the converted data are output to the exposing LD control unit 52. The exposing LD control unit 52 controls the activation of the LDs 41*a* and 41*b* in the writing apparatus 14 in accordance with the exposing data of the second picture plane—second color. In such a manner, the electrostatic latent image of the second picture plane—second color is formed.

The developing sleeve 23*a* of the developing apparatus 23 is for performing the development of the second color while continuing to rotate without stopping, even after finishing the development of the electrostatic latent image of the first picture plane—second color. Namely, the developing sleeve 23*a* continues to rotate during the time period when the writing apparatus 14 performs the writing operation. When the electrostatic latent image of the second picture plane—second color on the photosensitive body 11 arrives at the developing position, the developing apparatus 23 starts the development of the electrostatic latent image in order to obtain the toner image.

When the toner image of the second picture plane second color on the photosensitive body 11 arrives at the first transfer position, the toner image is transferred by the belt transfer charger 20 onto the same position as that of the toner image of the second picture plane—first color on the intermediate transfer belt 13 so as to superpose it an the toner image of the second picture plane—first color.

When the scanner finishes reading the manuscript document in order to obtain the image signal of the second picture plane—second color, the scanner returns to the home position with high speed and waits at the home position until starting the reading operation of the manuscript document in order to obtain the image signal of the next first picture plane third color (magenta).

When the development of the electrostatic latent image of the second picture plane second color, the printer control section causes the revolver motor 61 to rotate the rotating apparatus 12 such that the developing apparatus 24 for performing the development of the third color (magenta) arrives at the developing position and stops thereon.

Thereafter, the printer control section starts the thrusting operation when the mark sensor 33 detects the standard mark on the intermediate transfer belt 13 and the mark detecting signal from the mark sensor 33 is inputted to the thrusting terminal of the CPU 47, and the printer control section transmits to the scanner control section the indication that the scanning of the first picture—third color (magenta) is starting.

When the scanner control section receives the start indication, the scanner control section causes the scanner to read the manuscript document in order to obtain the image signal of the first picture plane—third color. The scanner control section converts the image signal of the plural colors thus read to the image signal of the first picture plane—third color and transfers the converted image signal to the printer control section.

The printer control section transfers the image signal transferred from the scanner control section. The writing control section IC 51 converts the image signal to exposure data of the first picture plane—third color and outputs the converted data to the exposing LD control unit 52.

The exposing LD control unit 52 controls the activation of the LDs 41a and 41b in the writing apparatus 14 in accordance with the exposing data of the first picture plane—third color from the writing apparatus 14. In such a manner, the electrostatic latent image of the first picture plane—third color by writing in the image of the first picture plane—third color onto the photosensitive body 11.

The printer control section causes the developing motor 60 to start the rotation of the developing sleeve 24a of the developing apparatus 24 for performing the development of the third color prior to starting the writing operation of the writing apparatus 14.

When the electrostatic latent image of the first picture plane—third color on the photosensitive body 11 arrives at the developing position, the developing apparatus 24 starts the development of the electrostatic latent image in order to obtain the toner image of the first picture plane—third color.

When the toner image of the first picture plane—third color is transferred, in a superposition manner, by the belt transfer charger 20 on the same position as that of the toner image of the first picture plane—first color and the toner image of the first picture plane—second color on the intermediate transfer belt 13, the toner image is superimposed with that of the first picture plane—first color and the first picture plane—second color. When the scanner finishes reading the manuscript in order to obtain the image signal of the first picture plane third color, the scanner returns to the home position with high speed and waits at the home position until beginning to read the manuscript document in order to obtain the next second picture plane—third color (magenta).

Next, the printer control section transmits an indication that the scanning operation of the second picture plane—third color to the scanner control section is started. When the scanner control section receives the indication, the scanner control section causes the scanner to read the manuscript document in order to obtain the image signal of the second picture plane—third color, and convert the image signal of the plural colors thus read to the image signal of the second picture plane—third color, and transfer the converted image signal to the printer control section.

The printer control section transfers the image signal transferred from the scanner control section to the writing control section IC 51, and the control section IC 51 converts the image signal to the exposing data of the second picture plane—third color and outputs the converted data to the exposing LD control unit 52.

The exposing LD control unit 52 controls the activation of the LDs 41a and 41b in the writing apparatus 14 and causes the photosensitive body 11 to form the electrostatic latent image of the second picture plane—third color by writing in the image of the second picture plane—third color on the photosensitive body 11.

The developing sleeve 24a of the developing apparatus 24 for developing the third color continues to rotate without stopping even after finishing the development of the electrostatic latent image of the first picture plane—third color, namely, the developing sleeve 24a rotates during the writing operation of the writing apparatus 14. When the electrostatic latent image of the second picture plane—third color on the photosensitive body 11 arrives at the developing position, the developing apparatus 24 starts to develop the electrostatic latent image in order to obtain the toner image of the second picture plane—third color.

When the toner image of the second picture plane—third color arrives at the first transfer position, the toner image is superposedly transferred onto the same position as that of the toner image of the second picture plane—first color and that of the toner image of the second picture plane—second color on the intermediate transfer belt 13 by use of the belt transfer charger 20, so as to superpose the above described toner image onto the toner image of the second picture plane—first color and the toner image of the second picture plane—second color.

When the scanner finishes reading the manuscript document in order to obtain the image data of the second picture plane—third color, the scanner returns to the home position with high speed and waits at the home position until beginning to read the manuscript document for obtaining the image data of the next first picture plane—fourth color (yellow).

When the development of the electrostatic latent image of the second picture plane—third color is finished, the printer control section causes the revolver motor 61 to rotate the rotating apparatus 12 such that the developing apparatus 25 for developing the fourth color (yellow) stops at the developing position.

Thereafter, when the mark sensor 33 detects the standard mark on the intermediate transfer belt 13 and the mark detecting signal from the mark sensor 33 is inputted to the thrusting terminal of the CPU 47 as the intermediate transfer standard signal, the printer control section starts the thrusting process and transmits the start indication.

When the scanner control section receives the indication that the scanning of the first picture plane—fourth color has started, the scanner control section causes the scanner to read the manuscript document in order to obtain the image data of the first picture plane—fourth color and convert the read image data of the plural colors to the image data of the first picture plane—fourth color. The converted data are transferred to the printer control section.

The printer control section transfers the image data transferred from the scanner control section to the writing control section IC 51. The writing control section IC 51 converts the transferred image data to the exposing data of the first picture plane—fourth color, and the converted data are outputted to the exposing LD control unit 52.

The exposing LD control unit 52 controls the activation of the LDs 41a and 41b in the writing apparatus 14 in accordance with the exposing data of the first picture plane—fourth color from the writing control section, and the control unit forms the electrostatic latent image of the first picture plane—fourth color, by writing the image of the first picture plane—fourth color onto the photosensitive body 11.

The printer control section starts the rotation of the developing sleeve 25a in the developing apparatus 25 for developing the fourth color prior to the start of the writing operation by the writing apparatus 14. When the electrostatic latent image of the first picture plane—fourth color arrives at the developing position on the photosensitive body 11, the developing apparatus 25 starts the development of the electrostatic latent image and obtains the toner image of the first picture plane—fourth color.

When the toner image of the first picture plane—fourth color on the photosensitive body 11 arrives at the first transferring position, the toner image is superposedly transferred onto the same position as that of the toner image of the first picture plane—first color, that of the toner image of the first picture plane—second color, and that of the toner image of the firm picture plane—third color, all formed on the intermediate transfer belt 13 by use of the belt transfer charger 20, such that the toner image of the first picture plane—fourth color is superposed on the toner image of the first color, that of the second color, and that of the third color. In such manner, the full-color image can be formed on the first picture plane.

When the operation of reading the manuscript is finished in order to obtain the image data of the first picture plane—fourth color, the scanner returns to the home position with high speed and waits at the home position until the operation of reading the manuscript document is started in order to obtain the image data of the next second picture plane—fourth color (yellow).

Next, the primer control section transmits to the scanner control section the start indication, indicative of the beginning of the scanning operation of the second picture plane fourth color. When the scanner control section receives the start indication, the scanner control section causes the scanner to perform the reading the manuscript document operation in order to obtain the image data of the second picture plane—fourth color. The scanner control section further converts the read image data of the plural colors to the image data of the second picture plane—fourth color. The converted image data of the second picture plane —fourth color are transferred to the printer control section.

The printer control section transfers the image data transferred from the scanner control section to the writing control section IC 51. The writing control section IC 51 converts the transferred image data to the exposing data of the second picture plane—fourth color, and outputs the converted data to the exposing LD control unit 52.

The exposing LD control unit 52 controls the activation of the LDs 41a and 41b in the writing apparatus 14 in accordance with the exposing data of the second picture plane— fourth color from the writing control section IC 51. The image of the second picture plane—fourth color is written on the photosensitive body 11, and thereby the electrostatic latent image of the second picture plane—fourth color can be formed thereon.

The developing sleeve 25a in the developing apparatus 25 is for developing the fourth color and continues to rotate without stopping even after finishing the development of the electrostatic latent image of the first picture plane—fourth color. Namely, the developing sleeve 25a rotates when the writing apparatus 14 performs the writing operation. When the electrostatic latent image of the second picture plane— fourth color on the photosensitive body 11 arrives at the developing position, the developing apparatus 25 starts the development of the electrostatic latent image and obtains the toner image of the second picture plane—fourth color.

When the toner image of the second picture plane—fourth color on the photosensitive body 11 arrives at the first transfer position, the toner image is superposedly transferred on the same position as that of the toner image of the second picture plane—first color, that of the toner image of the second picture plane—second color, and that of the toner image of the second picture plane—third color, all formed on the intermediate transfer belt 13 by use of the belt transfer charger 20 such that the toner image of the fourth color is superposed on the composite toner image of the first color, that of the second color, and that of the third color. In such manner, the full-color image of the second picture plane can be formed thereon.

When the reading operation of the manuscript document, for obtaining the image data of the second picture plane— fourth color, is finished the scanner returns to the home position with high speed and waits at the home position until beginning the reading operation for obtaining the image data of the next third picture plane—first color (black).

When the development of the electrostatic latent image of the second picture plane fourth color is finished as is the belt transfer (the transfer from the photosensitive body 11 to the intermediate transfer belt 13) of the toner image of the second picture plane—fourth color, the printer control section turns on the paper transferring apparatuses, immediately before the full-color image on the intermediate transfer belt 13 arrives at the paper transfer position between the intermediate transfer belt 13 and the paper transfer apparatus 35. Consequently, the paper transfer apparatus 35 transfers the full-color image on the intermediate transfer belt 13 onto the transfer material.

When the two-sheets transfer (the transfer of the full-color image from the intermediate transfer belt 13 to the transfer material) of the full-color image on the first picture plane and that on the second picture plane is finished, the printer control section causes the revolver motor 61 to rotate the rotating apparatus 12 such that the developing apparatus 22 for developing the first color (black) comes to the developing position and stops thereon.

The respective transfer operations of the full color images on the first and second picture planes from the intermediate transfer belt 13 to the transfer materials for the first and second picture planes continue. The transfer materials for the first and second picture planes respectively having the first and second full color images transferred thereon are respectively conveyed to the fixing apparatus by use of the conveying belt 38. The full color image of the first picture plane and that of the second picture plane are respectively fixed by the fixing apparatus, and the transfer materials thus fixed are discharged onto the (paper) discharging tray.

When the mark sensor 33 detects the standard mark on the intermediate transfer-belt 13 by the rotation of the intermediate transfer belt 13, the printer control section starts to perform the thrusting process on the program when the mark detecting signal from the mark sensor 33 is inputted to the thrusting terminal of the CPU 47 as the intermediate standard signal, and then the printer control section transmits to the scanner control section the indication that the scanning operation of the third picture plane—first color (black) during the time period of the thrust processing is starting.

When the scanner control section receives the indication, the scanner control section causes the scanner to perform the operation of reading the manuscript document in order to obtain the image data of the third picture plane—first color, converts the read image data of the plural colors to the image data of the third picture plane—first color, and transfers the converted image data to the printer control section.

The printer control section transfers the image data transferred from the scanner control section to the writing control section IC 51. The writing control section IC 51 converts the image data to the exposing data of the second picture plane—fourth color, the printer control section turns on the paper transferring apparatuses, immediately before the full-color image on the intermediate transfer belt 13 arrives at the paper transfer position between the intermediate transfer belt 13 and the paper transfer apparatus 35. Thereby, the paper transfer apparatus 35 transfers the full-color image on the intermediate transfer belt 13 onto the transfer material.

The printer control section transfers the image data transferred from the scanner control section to the writing control section IC 51. The writing control section IC 51 converts the image data to the exposing data of the third picture plane—first color and outputs the converted data to the exposing LD control unit 52. The exposing LD control unit 52 controls the activation of the LDs 41*a* and 41*b* in the writing apparatus 14 in accordance with the exposing data of the third picture plane—first color from the writing control section IC 51. And then, the exposing LD control unit 52 writes the image of the third picture plane—first color onto the photosensitive body 11, and thereby forms the electrostatic latent image of the third picture plane—first color.

Subsequently, the processes from the development of the electrostatic latent image of the third picture plane—first color to the belt-transferring (transferring to the belt) of the toner image of the fourth picture plane—fourth color are performed in the same way as that of the aforementioned processes from the development of the electrostatic latent image of the first picture plane—first color to the belt-transferring of the toner image of the second picture plane—fourth color.

Thereafter, the full-color image of the third picture plane and the full-color image of the fourth picture plane are formed in the same way as that of the full-color images of the first and second picture planes.

When the development of the electrostatic latent image of the fourth picture plane fourth color is finished and the belt transferring of the toner image of the fourth picture plane —fourth color is also finished, in order to transfer the full color image on the intermediate belt 13 onto the transfer material, the printer control section turns on the paper transfer apparatus 35 and thereby the paper transfer apparatus 35 transfers the full-color image on the intermediate transfer belt 13 onto the transfer material immediately before the full-color image on the intermediate transfer belt 13 arrives at the paper transfer position between the intermediate transfer belt 13 and the paper transfer apparatus 35.

Thereafter, the printer control section turns on the solenoid 66 for attaching/detaching the belt cleaning apparatus and brings the belt cleaning apparatus 36 into contact with the intermediate transfer belt 13. Thereby, the belt cleaning apparatus 36 starts to clean the intermediate transfer belt 13.

When the secondary transfer operation of the full-color images of the third and fourth picture planes is finished, the printer control section causes the revolver motor 61 to rotate the rotating apparatus 12 such that the developing apparatus 22 for performing the development of the first color (black) arrives at the developing position and immediately stops thereon.

Thereafter, the printer control section turns off the solenoid for attaching/detaching the belt cleaning apparatus and thereby detaches the belt cleaning apparatus 36 from the intermediate transfer belt 13. Furthermore, the printer control section controls the drum motor 59 and thereby also controls the stop position of the intermediate transfer belt 13, so as to place the apparatus in a waiting state.

Moreover, in this embodiment, it is permissible, if not preferable, to position at least two segments of the standard mark on the intermediate transfer belt 13 at a predetermined interval (space), for instance, at uniformly spaced intervals in a rotational direction of the intermediate transfer belt 13.

On this occasion, the printer control section performs the control operations for each of the respective colors as mentioned below. Namely, the printer control section transmits to the scanner control section the indication of the start of the scanning operation at a standard (starting) time by detecting with the mark sensor 33 the first standard mark on the intermediate transfer belt 13. Thereby, the printer control section causes the scanner to read the manuscript document in order to obtain the image date on one picture plane, and then the full-color image of one picture plane to be formed first, among the full-color images of two picture planes to be formed on the intermediate transfer belt 13.

Furthermore, the printer control section transmits the indication to the scanner control section at the standard (starting) time of detecting the second standard mark on the intermediate transfer belt 13 by use of the mark sensor 33. Thereby, the printer control section causes the scanner to read the manuscript document in order to obtain the image data on another picture plane, and then the full-color image of another picture plane to be formed secondly among the full-color images of two picture planes to be formed on the intermediate transfer belt 13.

Figure 1:
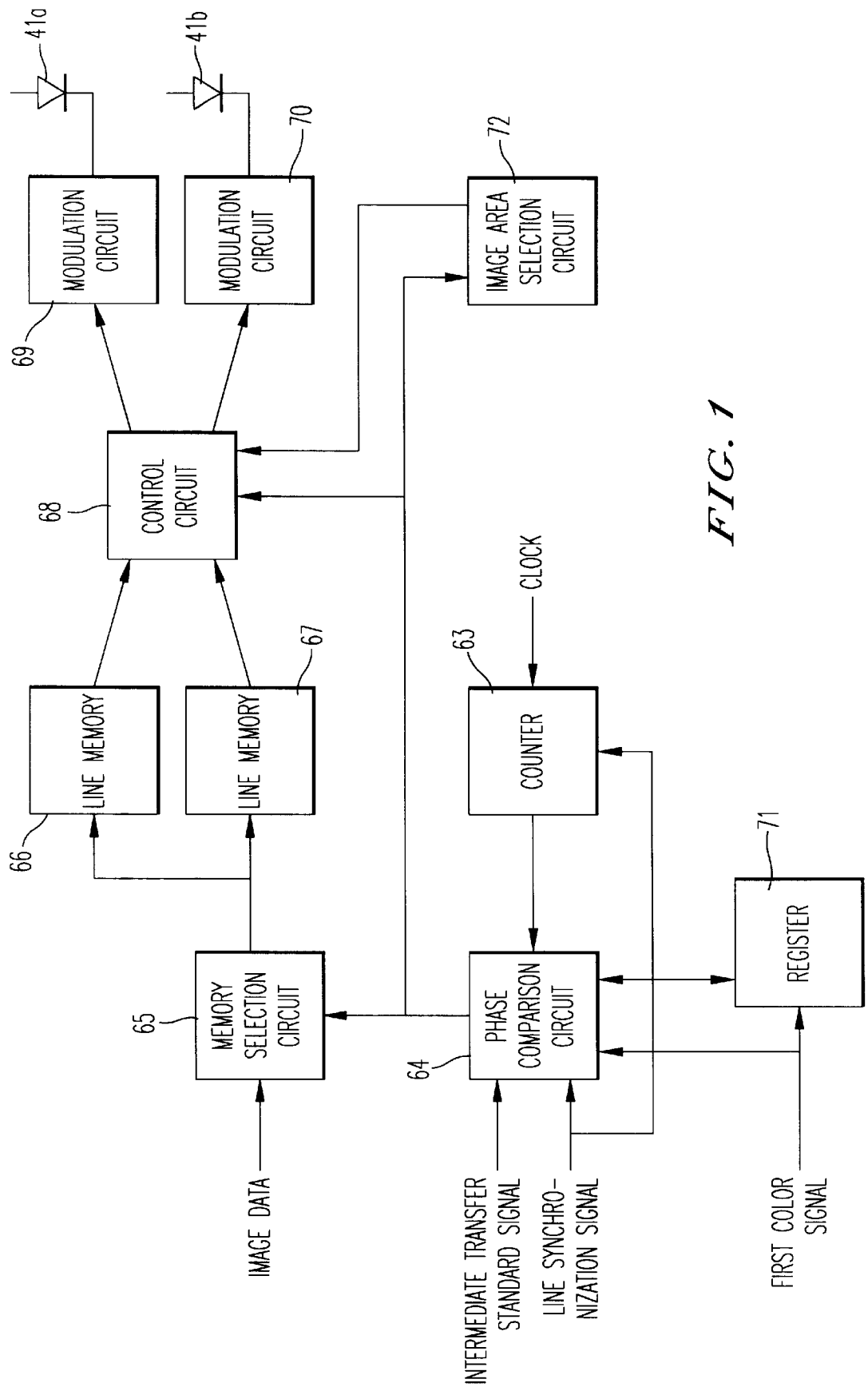
FIG. 1 is a block diagram showing a video signal creating circuit in a light-exposing laser diode (LD) control unit in an embodiment according to the present invention.

FIG. 1 shows a video signal generating (creating) circuit in the above-mentioned light-exposing LD control unit 52. A counter 63 is cleared by a line synchronization signal transmitted from the above-mentioned synchronization detecting unit (detector), and the counter 63 counts clock pulses from a clock generating section (generator) not shown with the line synchronization signal from the above synchronization detector, and outputs the count value to a phase comparison circuit 64.

The phase comparison circuit 64 compares the phase of the mark detecting signal inputted from the above-mentioned mark sensor 33 as the intermediate transfer standard signal with that of the line synchronization signal.

Namely, the phase comparison circuit 64 operates when the intermediate transfer standard signal is inputted thereto from the mark sensor 33 and takes therein the count value (the count value immediately before being reset by the line synchronization signal of the counter 63) of the counter at the time point when the first line synchronization signal is inputted from the synchronization detector, and thereby obtains the value of the phase difference between the intermediate transfer standard signal and the line synchronization signal and outputs the value thus obtained to a memory selecting circuit 65.

The memory selecting circuit 65 compares the comparison result (count value) of the phase comparison circuit 64 with the predetermined standard count value and thereby judges whether the phase difference between the intermediate transfer standard signal and the line synchronization signal is larger than the standard count value. In accordance with the judgment result thereof, the memory selecting circuit 65 selects whether the image data of the first one line among the image data (the aforementioned exposing data) of the one picture plane—one color from the writing control section IC are inputted to either one of line memories 66 and 67.

Hereupon, the line memories 66 and 67 are respectively divided into three lines A, B, and C and are respectively composed of the line memories 66A–66C and 67A–67C (not expressly labeled in FIG. 1 as such). The synchronization detector detects almost at the same time two lines of the laser beam emitted from the semiconductor lasers (for instance, laser diodes) 41a and 41b, and outputs one line synchronization signal per writing operation of writing two lines with the laser beams emitted from the semiconductor lasers 41a and 41b. However, the standard count value is set to a value corresponding to the value which is almost equal to half of the distance (interval) between two line synchronization signal (time period required for writing in approximately one line).

If the comparison result (count value) of the phase comparison circuit 64 and the standard count value are compared with each other and the phase difference between the intermediate transfer signal and the line synchronization signal is smaller than the standard count value, the first line of the image data among the image data (the aforementioned exposing date) of one picture plane—one color from the writing control section IC 51 are stored in the line memory 66 (either one of the memories 66A–66C). Thereafter, the image data of second line and other lines subsequent thereto are alternately stored, respectively, in the line memory 67 (any of 67A–67C), in line memory 66 (any of 66A–66C), in the line memory 67 (any of 67A–67C), . . . , in this order.

Furthermore, the memory selection circuit 65 compares the comparison result (count value) of the phase comparison circuit 64 with the standard count value. If the phase difference between the intermediate transfer standard signal and the line synchronization signal is equal to or larger then the standard count value, the first line of the image data among the image data (aforementioned exposing data) of one picture plane—one color from the writing control section IC 51 is stored in the line memory 67 (any of 67A–67C) and the image data of the second line and the other lines subsequent thereto are alternately stored in the line memory 66 (any of 66A–66C), in the line memory 67 (any of 67A–67C), in the line memory 66 (any of 66A–66C), . . . , in this order.

The image data from the line memory 66 (66A–66C) are inputted to a modulation circuit 69 through a control circuit 68. The modulation circuit 69 modulates and drives the semiconductor laser (e.g., Laser diode) 41a in accordance with the input image data. The image data from the line memory 67 (67A–67C) are inputted to a modulation circuit 70 through the control circuit 68. The modulation circuit 70 modulates and drives the semiconductor laser (e.g., Laser diode) 41b in accordance with the input image data.

On the photosensitive body 11, the line to be written with the laser beam emitted from the semiconductor laser 41a is situated further up-stream side in the sub-scanning direction than the line to be written with the laser beam from the semiconductor laser 41b. Consequently, if the phase difference between the intermediate transfer standard signal and the line synchronization signal is smaller than the count value, as is the usual case, the first line is written with the laser beam from the semiconductor laser 41a, and then the second line is written with the laser beam from the semiconductor laser 41b which is down-stream in the sub-scanning direction. Thereafter, the respective lines are alternately written line-by-line along the sub-scanning direction with two laser beams from the semiconductor lasers 41a and 41b, in a similar way.

Furthermore, if the phase difference between the intermediate transfer standard signal and the line synchronization signal is equal to or larger than the count value. The first line is written with the laser beam from the semiconductor laser 41b, and then the second line is written with the laser beam from the semiconductor laser 41a at the down-stream side in the sub-scanning direction. Thereafter, the respective lines are alternately written in a similar way line-by-line along the sub-scanning direction with two laser beam lines from the semiconductor lasers 41b and 41a.

Figure 2:
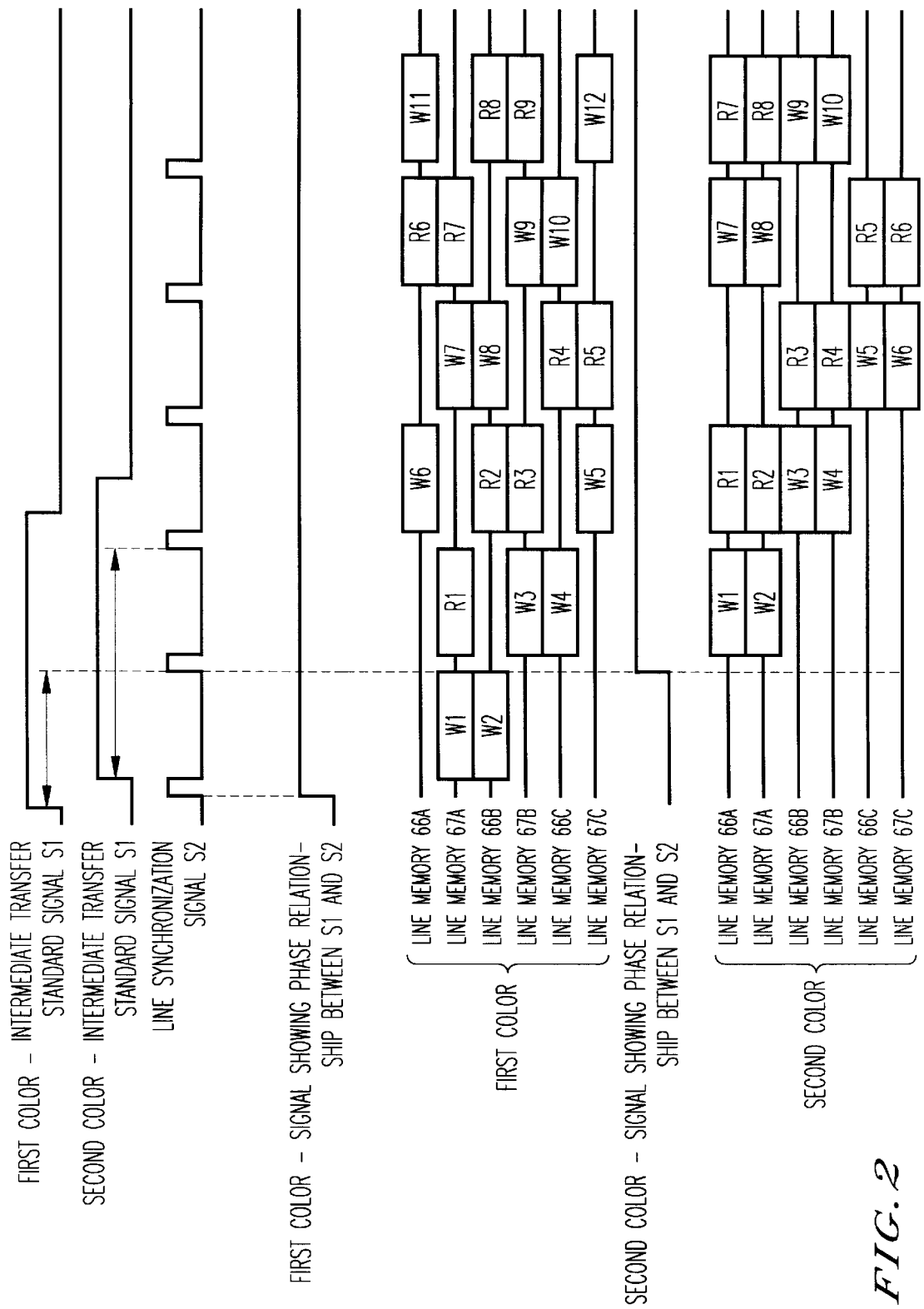
FIG. 2 is a timing chart showing an operational timing of a line memory in the embodiment.

FIG. 2 shows the operational timing of the line memories 66 and 67. The operational timing shows, as an example, the case that the phase difference between the intermediate transfer standard signal and the line synchronization signal is equal to or larger than the standard count value at the time the image data of the first color is input from the writing control section IC 51.

The memory selection circuit 65 writes, into the line memory 67A, as writing operation W1, the image data of the first line among the image data of the first color from the writing control section IC 51. Next, the memory selection circuit 65 writes, as writing operation W2, into the line memory 66B the image data of the second line among the image data of the first color from the writing control section IC 51.

Thereafter, in the subsequent procedure, the memory selection circuit 65 respectively and alternately performs, into the line memories 66 and 67, line by line, the writing operations W3, W4, of the image data of the first color, third line and other lines subsequent thereto from the writing control section IC 51.

The image data of the first color, second line are repeatedly written line-by-line in the order of line memory 66C→line memory 66A→line memory 66B into the line memory 66, while the image data of the first color, first line are repeatedly written line-by-line in the order of line memory 67B→line memory 67C→line memory 67A into the line memory 67.

Furthermore, the memory selection circuit 65 alternately performs the reading operations R1, R2, R3, . . . of the image data of the first color—first line and other lines subsequent thereto from the line memories 67 and 66.

Moreover, the line memory 67 repeats the reading operations in the order of line memory 67A→line memory 67B→line memory 67C so as to read out the image data of the first color in order line-by-line, while the line memory 66 repeals the reading operations in the order of line memory 66B→line memory 66C→line memory 66A so as to read the image data of the first color in order, line-by-line.

When the image data of the second color are inputted from the writing control section IC 51, the phase difference between the intermediate transfer standard signal and the line synchronization signal is smaller than the standard count value. The memory selection circuit 65 performs, into the line memory 66A, the writing operation W1 of the image data of the first line among the image data of the second color from the writing control section IC 51. Next, the memory selection circuit 65 performs, into the line memory 67A, the writing operation W2 of the image data of the second line among the image data of the first color from the writing control section IC 51.

Thereafter, in the subsequent procedure, the memory selection circuit 65 respectively and alternately performs, into the line memories 66 and 67, line-by-line, the writing operations W3, W4, of the image data of the second color, third line and other lines subsequent thereto from the writing control section IC 5 1. The image data of the first color are repeatedly written line-by-line in the order of line memory 66B→line memory 66C→line memory 66A into the line memory 66, while the image data of the second color are repeatedly written line-by-line in the order of line memory 67B→line memory 67C→line memory 67A into the line memory 67.

Furthermore, the memory selection circuit 65 alternately performs the reading operations R1, R2, R3, . . . of the image data of the second color—first line and other lines subsequent thereto from the line memories 66 and 67. Moreover, the line memory 66 repeats the reading operations in the order of line memory 66A→line memory 66B→line memory 66C so as to read out the image data of the first color in order line-by-line, while the line memory 67 repeats the reading operations in the order of line memory 67A→line memory 67B→line memory 67C so as to read the image data of the second color in order line-by-line.

Figure 3:
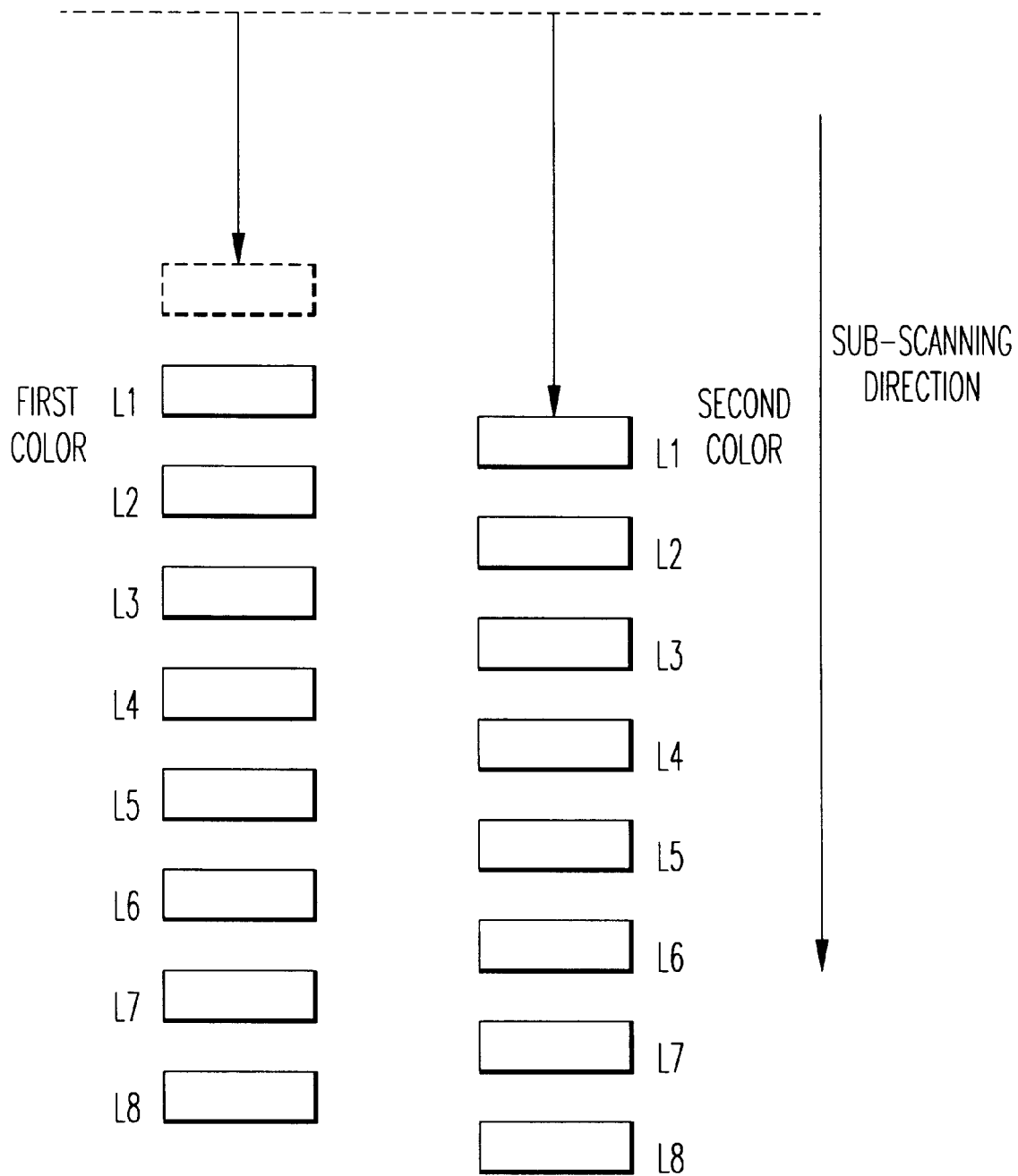
FIG. 3 is an explanatory diagram showing the positions of the respective color lines relative to an intermediate transfer mark standard according to the operational timing shown in FIG. 2.

FIG. 3 shows an intermediate transfer mark standard corresponding to the operational timing as shown in FIG. 2 (writing position at the time of detecting the mark by use of the mark sensor on the photosensitive body 11) and writing positions for writing in the respective lines L1, L2, . . .

Conventionally, even though the phase difference between the intermediate transfer standard signal and the line synchronization is equal to or larger than the standard count value, the respective lines L1, L2, . . . of the first color are written without shifting the lines in the sub-scanning direction as shown by the dotted line in FIG. 3. However, in the embodiment of the present invention, when the phase difference between the intermediate transfer standard signal and the line synchronization signal is equal to or larger then the standard count value, the respective lines L1, L2, . . . of the first color are shifted in the sub-scanning direction and the writing operation is done as shown by the solid line in FIG. 3. Therefore, it turns out to be possible to reduce the relative shifting of the respective color toner images.

Namely, the respective color image forming operation of forming the toner image of the respective colors on the photosensitive body 11 is performed on the photosensitive body 11 in synchronism with the intermediate transfer standard signal from the mark sensor 33, and at the same time the writing operation is performed per plural lines by use of the plural light beams from the plural light sources 41a and 41b in synchronism with the line synchronization signal from the synchronization detector.

Accordingly, since the phase difference between the intermediate transfer standard signal and the line synchronization signal is compared with the standard value (standard count value), and then the light source for starting the writing operation (the light source used for starting the writing operation) among the plural light sources 41a and 41b is changed over per each of the respective colors in accordance with the result of the above-mentioned comparison, it is possible to compensate the color shifting by adjusting the start positions for writing in the image in the sub-scanning direction per each of the respective colors.

Hereupon, when the phase comparison results between the intermediate transfer standard signal and the line synchronism signal when writing the images of the first and second colors are approaching each other on the border of the standard count value, if only either one of the start positions for writing the image in the sub-scanning direction is shifted as mentioned above, the color shifting tends to become large at the starting position for writing in the image in the sub-scanning direction.

In such situation, as shown in FIG. 1, the first color signal showing whether the image data inputted into the memory selection circuit 65 from the writing control section IC 51 are the image data of the first color is inputted into the register 71. When the image data inputted into the memory selection circuit 65 from the writing control section IC 51 are the image data of the first color, the result of comparing the phase of the intermediate transfer standard signal by the phase comparison circuit 64 with that of the line synchronization signal is stored in the register 71.

When the input image data are of the color excluding the first color, the memory selection circuit 65 compares the result of the phase comparison between the phase of the intermediate transfer standard signal and that of the line synchronization not only with the standard count value but also with the phase comparison result memorized in the register 71.

The memory selection circuit 65 further performs the comparative operational calculation of the phase comparison result memorized in the register 71 and the phase comparison result of the phase comparison circuit 64. In accordance with the result of the above-mentioned comparative operational calculation, the memory selection circuit 65 selects either one of the line memories 66 and 67, into which the image data of the first one line among the image data of the respective colors from the writing control section IC 51 are inputted, such that the writing start position of the various colors on the photosensitive body 11 is not shifted. As to the image data of the second line and the other lines subsequent thereto, the image data are alternately inputted into the line memories 66 and 67 in the same manner as mentioned above.

Namely, the memory selection circuit 65 compares the phase comparison result memorized in the register 71 with the phase comparison result of the phase comparison circuit 64, regarding the second and subsequent lines.

When the difference obtained by the above-mentioned comparison is smaller than the predetermined value, the image data of the first one line among the image data of the respective colors from the writing control section IC 51 are selected in the same way as that of the writing operation of the first color without selecting either one of the line memories 66 and 67 as mentioned above. As to the image data of the second line and the other lines subsequent thereto, the image data are alternately inputted into either one of the line memories 66 and 67.

On some occasions, the effective areas of the image in the sub-scanning direction differ from each other per each of the respective lines. In such situations, an image area selection circuit 72 selects the effective area of the image per each of the respective lines in accordance with the phase comparison result of the phase comparison circuit 64 and the phase comparison result in the register 71. A control circuit 68 transmits line-by-line the image data from the line memories 66A–66C and 67A–67C to modulation circuits 69 and 70, corresponding to the image effective area selected by the image area selection circuit 72. For this reason, the noise signal, etc. outside of the image effective area is cut off by the control circuit 68, and thus the noise signal is not inputted in the modulation circuit 69 and 70. Consequently, the condition of deteriorating the image due to noise signal, etc. is eliminated and the quality is largely improved.

As previously mentioned heretofore, a first aspect of the present embodiment according to the present invention includes a light source 41 as a light beam emitting mechanism for emitting plural light beams; a rotatable polygon mirror as a scanning mechanism for scanning the plural light beams emitted from the light beam emitting mechanism; a photosensitive drum as a photosensitive body moving in the sub-scanning direction and scanned by the plural light beams emitted from the scanning mechanism on which electrostatic latent image composed of plural colors is formed in order by moving in the sub-scanning direction and scanning by plural light beams emitted from the scanning mechanism 43 and thereby writing the image composed of plural colors in order; a synchronization detector as a line synchronization signal generating mechanism for generating line synchronization signal by detecting the light beams; plural developing media for developing the electrostatic latent image of the plural colors formed on the photosensitive body 11 and thereby obtaining the toner image of plural colors; an intermediate transfer belt 13 as an intermediate transfer body onto which the toner image of plural colors is transferred so as to be superposed on each other; and a mark sensor 33 as an intermediate transfer standard signal generating mechanism for detecting a mark on the intermediate transferring body and thereby generating the intermediate transfer standard signal.

The operation of forming the image of respective colors is performed in synchronism with the intermediate transfer standard signal generated by the intermediate transfer generating mechanism 13. The light beam is modulated with the image signal in synchronism with the line synchronization signal, and thereby the image is written in line-by-line.

The color image forming apparatus also includes the counter 63, the phase comparison circuit 64, and the memory selection circuit 65 as compensation media for changing the light beam among the plural light beams for first writing the image onto the photosensitive body 11, in accordance with the phase relationship between the intermediate transfer signal and the line synchronization signal. As a consequence, the starting position for performing the operation of writing the image is adjusted in the sub-scanning direction per each of the respective colors.

In such a structure, the start position for writing the image data can be adjusted in the sub-scanning direction, and thereby the color shift can be compensated. Consequently, the color image can be formed with a further superior image quality.

In another embodiment, or second status of the present invention, a starting position for writing the image of the first color among the plural colors is standardized and other starting positions for writing the images of the second and subsequent colors are adjusted on the basis of the standardized starting position and thereby the color shiftings are compensated for each other.

In such a structure, the color shift can be minimized and the compensation for the color shift can be performed with high precision.

In still another embodiment, or third status of the present invention, an effective image area in the sub-scanning direction is changed per each of the respective light beams so that unnecessary data are deleted. In such a structure, image deterioration can be eliminated so that image quality is improved.

The present invention is not limited to the above-mentioned embodiments. For instance, the light source using a light emitting diode (LED) can be used instead of the laser light source. Although the photosensitive drum is used in the embodiments discussed above, a photosensitive belt can be used instead of photosensitive drum. Furthermore, although the intermediate transferring belt is used in the embodiment, an intermediate transferring drum or an intermediate transferring roller can be used instead of the intermediate transferring belt.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuit or by interconnecting an appropriate network of conventional components, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

This application is based on Japanese patent application 9-045915 filed in the Japanese Patent Office on Feb. 28, 1997, the entire contents of which are hereby incorporated by reference.

What is claimed as new and desired to be secured by Letters Patent of the United States is:

1. A color image forming apparatus comprising:

light beam emitting means for emitting plural light beams;

scanning means for scanning the plural light beams emitted from said light beam emitting means;

a photosensitive body configured to have formed thereon, in order, plural latent image color components of an electrostatic latent image, respective of said plural latent image color components being formed by scanning the plural light beams across said photosensitive body while moving said photosensitive body in a sub-scanning direction;

line synchronization signal generating means for generating a scan line synchronization signal based on when respective of the light beams are detected by a detector;

plural developing means for developing the plural latent image color components of the electrostatic latent image so as to obtain plural color toner components;

an intermediate transferring body onto which plural color toner components are transferred so as to be superposed on each other and form a composite transferred image; and intermediate transfer standard signal generating means for detecting a mark on said intermediate transferring body and for generating an intermediate transfer standard signal in response to detecting said mark, wherein the intermediate transferring body is configured to transfer the plural color toner components in synchronism with the intermediate transfer standard signal;

said light beam emitting means modulates the plural light beams with an image signal in synchronism with the line synchronization signal so that said electrostatic latent image is written line-by-line, said color image forming apparatus further comprising compensation means for adjusting a starting position of writing respective scan lines in the sub-scanning direction per each of the plural latent image color components so as to compensate for color shift, and for changing from a first of said plural light beams to another of said plural light beams when first writing respective of the plural latent image color components in accordance with a phase relationship between the intermediate transfer standard signal and the line synchronization signal.

2. The color image forming apparatus as defined in claim 1, wherein:
said starting position is standardized based on a standardized position for writing afirst of the plural latent image color components, other starting positions for writing a second and subsequent of the plural latent image color components are adjusted relative to the standardized position so as to compensate for color shift.

3. The color image forming apparatus as defined in claim 1, wherein:
an effective image area in the sub-scanning direction is changed for each of the respective plural light beams so as to delete unnecessary image data.

4. The color image forming apparatus as defined in claim 1, wherein:
said light beam emitting means comprises a light source section.

5. The color image forming apparatus as defined in claim 4, wherein:
said light source section includes a laser light source.

6. The color image forming apparatus as defined in claim 4, wherein:
said light source section includes a light emission diode.

7. The color image forming apparatus as defined in claim 1, wherein:
said scanning means includes a rotatable polygon mirror.

8. The color image forming apparatus as defined in claim 1, wherein:
said line synchronization signal generating means includes a synchronization detector that generates the line synchronization signal by detecting respective of the plural light beams.

9. The color image forming apparatus as defined in claim 1, wherein:
said intermediate transferring body includes an intermediate transferring belt.

10. The color image forming apparatus an defined in claim 1, wherein:
said intermediate transferring body includes an intermediate transferring drum.

11. The color image forming apparatus as defined in claim 1, wherein:
said intermediate transferring body includes an intermediate transferring roller.

12. The color image forming apparatus as defined in claim 1, wherein:
said intermediate transfer standard signal generating means includes a mark sensor.

13. The color image forming apparatus as defined in claim 1, wherein:
said compensation means includes,
a counter,
a phase comparison circuit, and
a memory selection circuit.

14. The color image forming apparatus as defined in claim 1, wherein:
said photosensitive body includes a photosensitive drum.

15. The color image forming apparatus as defined in claim 1, wherein:
said photosensitive body includes a photosensitive belt.

16. A method of forming a color image on said photosensitive body comprising the steps of:
emitting plural light beams;
forming in order on a photosensitive body plural latent image color components of an electrostatic latent image by scanning the plural light beams in a scanning direction while moving said photosensitive body in a sub-scanning direction;
detecting respective of said light beams with a detector;
generating a line synchronization signal based on when the light beams are detected in said detecting step;
developing the plural latent image color components of the electrostatic latent image so as to obtain plural color toner components;
transferring the plural color image components to an intermediate transferring body so as to superimpose the plural color image components on one another;
detecting a mark on said intermediate transferring body and generating an intermediate transfer standard signal in response to detecting said mark, wherein
said forming step includes,
forming the plural latent image color components in synchronism with the intermediate transfer standard signal,
modulating the plural light beams with an image signal in synchronism with the line synchronization signal and writing in the electrostatic latent image line-by-line,
adjusting a starting position of writing respective lines in the sub-scanning direction per each of the plural latent image color components so as to compensate for color shift, and
changing from a first of said plural light beams to another of said plural light beams when writing respective of the plural latent image color components in accordance with a phase relationship between the intermediate transfer standard signal and the line synchronization signal.

17. The method of forming a color image on said photosensitive body as defined in claim 16, wherein:
said adjusting step comprising adjusting said starting position based on a standardized position for writing a first of the plural latent image color components, other starting positions for writing a second and subsequent of the plural latent image color components after adjusting said other starting positions relative to the standardized position so as to compensate for color shift.

18. The method of forming a color image on said photosensitive body as defined in claim 16, further comprising the step of:
changing an effective image area in the sub-scanning direction by changing from a first to a second of said plural light beams so as to delete unnecessary data.

19. A color printer comprising:
a laser beam light source configured to emit plural laser beams;
a writing apparatus having a scanning device configured to scan the plural light beams in a scanning direction;
a photosensitive body configured to have formed thereon, in order, plural latent image color components of an electrostatic latent image;
a rotational apparatus configured to rotate the photosensitive body in a sub-scanning direction, respective of said plural latent image color components being formed by scanning said photosensitive body with the plural light beams while said rotational apparatus moves said photosensitive body in the sub-scanning direction;

a detector configured to detect respective of the light beams;

a line synchronization signal generating configured to generate a scan line synchronization signal based on when respective of the light beams are detected by the detector;

plural developers configured to develop the plural latent image color components of the electrostatic latent image so as to obtain plural color toner components;

an intermediate transferring body onto which plural color toner components are transferred so as to be superposed on each other and form a composite transferred image; and and intermediate transfer standard signal generating mechanism configured to detect a mark on said intermediate transferring body and generate an intermediate transfer standard signal in response to detecting said mark; and a control section including,
a transfer control mechanism configured to control a transfer of the plural color toner components in synchronism with the intermediate transfer standard signal,
a modulation controller configured to modulate the plural light beams with an image signal in synchronism with the scan line synchronization signal so that said electrostatic latent image is written line-by-line, and
an adjustment mechanism configured to adjust a starting position of respective lines in the sub-scanning direction per each of the plural latent image color components so as to compensate for color shift, and configured to change from a first of said plural light beams to another of said plural light beams when writing respective of the plural latent image color components in accordance with a phase relationship between the intermediate transfer standard signal and the line synchronization signal.

20. The color image forming apparatus as defined in claim 19, wherein:
said photosensitive body includes a photosensitive drum.

21. The color image forming apparatus as defined in claim 19, wherein:
said photosensitive body includes a photosensitive belt.

22. The color image forming apparatus as defined in claim 19, wherein:
said intermediate transfer body includes an intermediate transfer belt.

23. The color image forming apparatus an defined in claim 19, wherein:
said intermediate transfer body includes an intermediate transfer drum.

24. The color image forming apparatus as defined in claim 19, wherein:
said intermediate transfer body includes an intermediate transfer roller.

25. The color image forming apparatus as defined in claim 19, further comprising:
a charge removing lamp and other components arranged around said photosensitive body, said other components including a charger configured to uniformly charging said photosensitive body, an electric potential meter configured to detect the electric potential on the surface of said photosensitive body, a photosensor configured to detect a toner density, a pre-transfer charge removing lamp, a transfer charger, and a cleaning apparatus configured to clean said photosensitive body.

26. The color image forming apparatus as defined in claim 19, wherein:
said rotational apparatus is configured to hold said plural developers and selectively move the plural developers to respective developing positions.

27. The color image forming apparatus as defined in claim 26, wherein:
developing sleeves are opposed to said photosensitive body at the respective developing positions during respective developing operations; and
said developing sleeves being rotatively driven by a developing motor such that developer in said plural developers is transported into an area between said photosensitive body and said developing sleeves in order to develop the electrostatic latent image on said photosensitive body.

28. The color image forming apparatus as defined in claim 26,
wherein a revolver home position sensor detects whether said drive means is located at a stop standard position.

29. The color image forming apparatus as defined in claim 19, further comprising:
a plurality of rollers on which said intermediate transfer body is disposed; and
a drum motor that drives at least one of said plurality of rollers so as to rotate said intermediate transfer body.

30. The color image forming apparatus as defined in claim 19, wherein:
an inner side of said intermediate transfer body has formed thereon the mark as a standard mark employed as a standard for adjusting positions of the respective plural toner color images when transferring the plural toner color images from said photosensitive body per respective image planes onto said intermediate transferring body.

31. The color image forming apparatus as defined in claim 19, further comprising:
a lubricant applying apparatus configured to apply lubricant on said intermediate transfer body;
a paper transfer unit; and
a cleaning apparatus configured to remove toner on said intermediate transfer body, respective of said lubricant applying apparatus, paper transfer unit, and cleaning apparatus being arranged along a rotational direction of said intermediate transfer belt, and wherein
said intermediate transfer standard signal generating mechanism includes a mark sensor for detecting the mark on said intermediate transferring body.

32. The color image forming apparatus as defined in claim 19, wherein:
said cleaning apparatus includes a cleaning blade, and is detachably attachable to said intermediate transfer body by actuation of a solenoid.

33. The color image forming apparatus as defined in claim 19, wherein:
said writing apparatus further comprises the laser beam light source, a cylinder lens, a polygon mirror, an optical scanning system including an fθ lens, a troidal lens, and a folding back mirror.

34. The color image forming apparatus as defined in claim 33, wherein:
said polygon mirror is rotatively driven by said polygon motor; and a synchronization detector is employed as the line synchronization signal generator and is configured to detect the respective light beams after the light beams pass through said troidal lens at a predetermined position outside of a writing area.

35. The color image forming apparatus as defined in claim 34, wherein:

said synchronization detector is configured to detect the plural light beams directed from said light source through said cylinder lens, said polygon mirror, said fθ lens, and said troidal lens, said synchronization detector configured to output an output signal as the line synchronization signal in response to detecting the plural light beams.

36. The color image forming apparatus as defined in claim 33, wherein:

said light source emits plural light beams modulated in accordance with an image signal.

37. The color image forming apparatus as defined in claim 33, wherein:

said laser beam light source includes a pitch adjusting mechanism configured to adjust a beam pitch in the sub-scanning direction, said light source being rotated by said pitch adjusting mechanism so as to adjust the beam pitch in the sub-scanning direction.

38. The color image forming apparatus as defined in claim 33, wherein:

said laser beam light source includes two semiconductor lasers configured to respectively output parallel light rays by use of a collimate lens, the light rays being transformed by an optical medium to have a predetermined light flux diameter after being passed through a slit of an aperture member.

39. The color image forming apparatus as defined in claim 38, wherein:

a polarizing direction of one of the light beams from one side of said aperture member is rotated by 90° by use of a ½-wavelength plate and then directed to a beam composing prism as incident light and reflected on an inner slanted surface of said beam composing prism, further reflected on a polarized beam splitter surface of said beam composing prism, and combined with a standard light beam emitted from another aperture member.

40. The color image forming apparatus as defined in claim 39, wherein:

two light beam lines from said beam composing prism are emitted in the scanning direction with a predetermined relative angular difference, and an optical axis of the two light beams being made slightly eccentric in the scanning direction in relation to said collimate lens, and said light source being rotated around the optical axis.

41. In the color image forming apparatus as defined in claim 19, wherein the control section further comprises:

a CPU configured to perform a control process by executing a control program;

a ROM configured to store said control program;

a RAM configured to store and retrieve data;

a data bus; and an address bus;

wherein said CPU, said ROM, and said RAM are connected to each other with said data bus and said address bus, and a serial communication controller performs an operation of transmitting and receiving commands between a control section in the scanning device and said CPU, said serial communication controller being connected to another serial controller by way of said data bus and said address bus.

42. The color image forming apparatus as defined in claim 41, wherein the control section further comprises:

a writing control section configured to perform a light exposure control operation that controls an amount of light exposure on said photosensitive body;

an I/O controller for controlling input/output operations from said CPU;

said writing control section and said CPU are connected to said data bus and said address bus;

a light-exposing LD control unit configured to control an exposing laser diode in said laser beam light source, wherein, said writing control section controls and is connected to said exposing LD control unit and said polygon motor, and said light-exposing LD control unit further controls an activation of said laser diodes in accordance with an input signal from said writing control section.

43. The color image forming apparatus as defined in claim 41, transfer comprising:

a color printer control section, wherein said scanning device receives an indication from the color printer control section of a commencement of a scanning operation and causes a scanner to read an image on a manuscript document, and thereafter convert the image thus read to the image signal to be transmitted to said control section of the color printer.

* * * * *